United States Patent
Lee et al.

(10) Patent No.: US 10,624,116 B2
(45) Date of Patent: Apr. 14, 2020

(54) METHOD AND APPARATUS FOR SCHEDULING TERMINAL IN WIRELESS COMMUNICATION SYSTEM

(71) Applicant: Samsung Electronics Co., Ltd., Suwon-si, Gyeonggi-do (KR)

(72) Inventors: Dongwoo Lee, Suwon-si (KR); Hoon Huh, Yongin-si (KR); Namhoon Kim, Suwon-si (KR); Sungkwon Jo, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 0 days.

(21) Appl. No.: 15/776,597

(22) PCT Filed: Dec. 21, 2016

(86) PCT No.: PCT/KR2016/015029
§ 371 (c)(1),
(2) Date: May 16, 2018

(87) PCT Pub. No.: WO2017/111470
PCT Pub. Date: Jun. 29, 2017

(65) Prior Publication Data
US 2018/0332604 A1 Nov. 15, 2018

(30) Foreign Application Priority Data
Dec. 21, 2015 (KR) .................. 10-2015-0183236

(51) Int. Cl.
*H04W 72/12* (2009.01)
*H04W 52/34* (2009.01)
(Continued)

(52) U.S. Cl.
CPC ....... *H04W 72/1284* (2013.01); *H04W 52/34* (2013.01); *H04W 52/365* (2013.01);
(Continued)

(58) Field of Classification Search
None
See application file for complete search history.

(56) References Cited

U.S. PATENT DOCUMENTS

2005/0249164 A1 11/2005 Kwak et al.
2008/0233948 A1 9/2008 Kazmi et al.
(Continued)

FOREIGN PATENT DOCUMENTS

| KR | 10-2014-0005310 A | 1/2014 |
| KR | 10-2015-0052353 A | 5/2015 |
| WO | 2015/090463 A1 | 6/2015 |

*Primary Examiner* — Diane L Lo
(74) *Attorney, Agent, or Firm* — Jefferson IP Law, LLP

(57) ABSTRACT

The present disclosure relates to a 4G communication system such as LTE and a 5G or pre-5G communication system for supporting a higher data rate after a 4G communication system. The present invention relates to a method for generating scheduling-related information comprising the steps of: receiving first reference information; receiving second reference information; generating first scheduling-related information using the received first reference information and second reference information, and generating second scheduling-related information by considering the first scheduling-related information; and sending the first scheduling-related information to a first cell and sending the second scheduling-related information to a second cell.

15 Claims, 15 Drawing Sheets

(51) Int. Cl.
*H04W 52/36* (2009.01)
*H04W 72/04* (2009.01)
*H04W 28/02* (2009.01)

(52) U.S. Cl.
CPC ..... *H04W 72/044* (2013.01); *H04W 72/1278* (2013.01); *H04W 28/0205* (2013.01); *H04W 28/0278* (2013.01); *H04W 72/1231* (2013.01); *H04W 72/1252* (2013.01)

(56) References Cited

U.S. PATENT DOCUMENTS

| | | |
|---|---|---|
| 2010/0158147 A1 | 6/2010 | Zhang et al. |
| 2014/0192756 A1 | 7/2014 | Baldemair et al. |
| 2014/0233535 A1 | 8/2014 | Zhao et al. |
| 2014/0241284 A1 | 8/2014 | Zhou |
| 2015/0085787 A1* | 3/2015 | Ouchi ............... H04L 5/0037 370/329 |
| 2015/0124673 A1* | 5/2015 | Ouchi ............... H04W 52/146 370/311 |
| 2015/0200761 A1* | 7/2015 | Kim ............... H04L 1/1867 370/280 |
| 2015/0222402 A1* | 8/2015 | Ouchi ............... H04L 1/00 370/329 |
| 2016/0359599 A1 | 12/2016 | Sun et al. |

\* cited by examiner

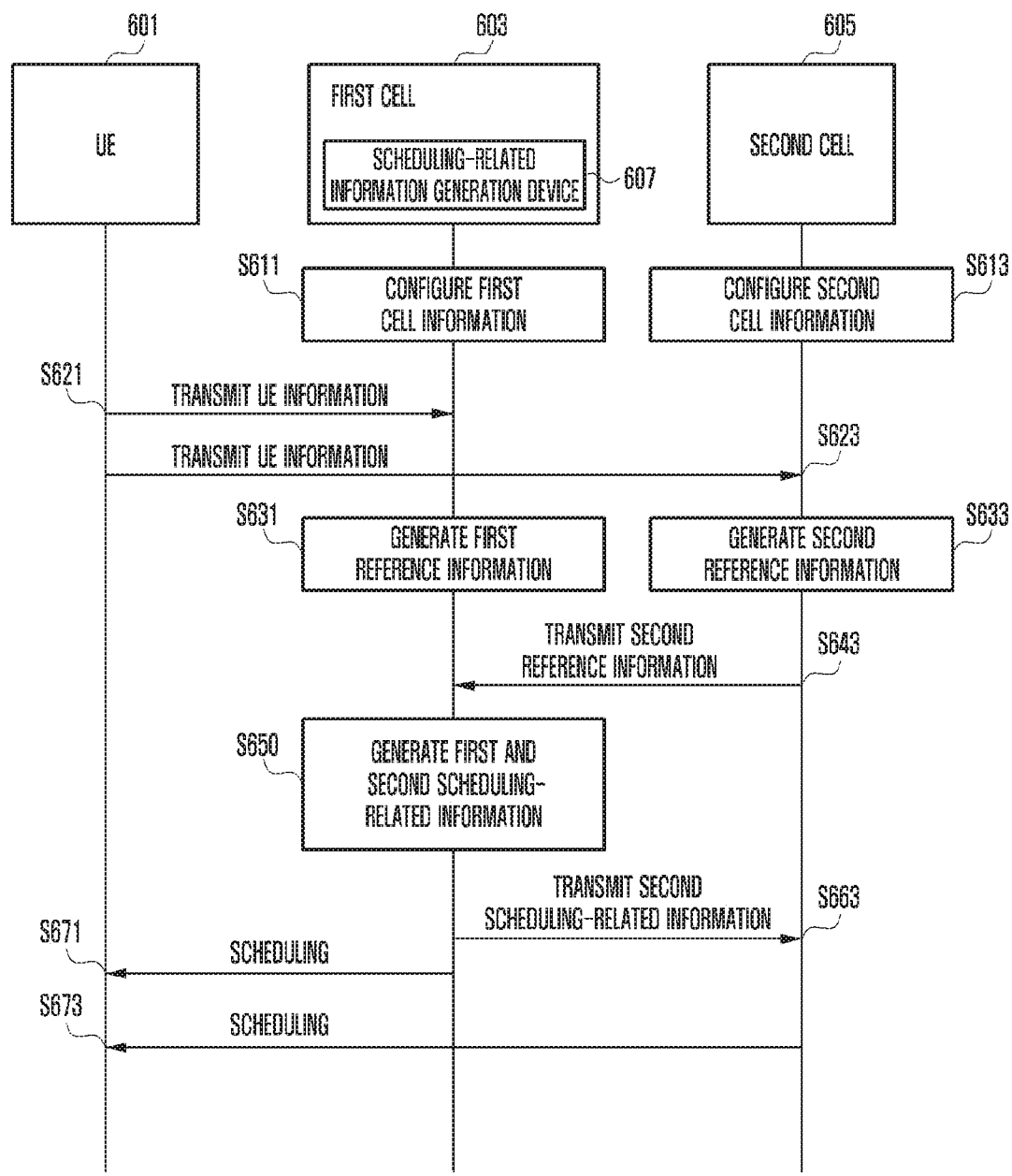

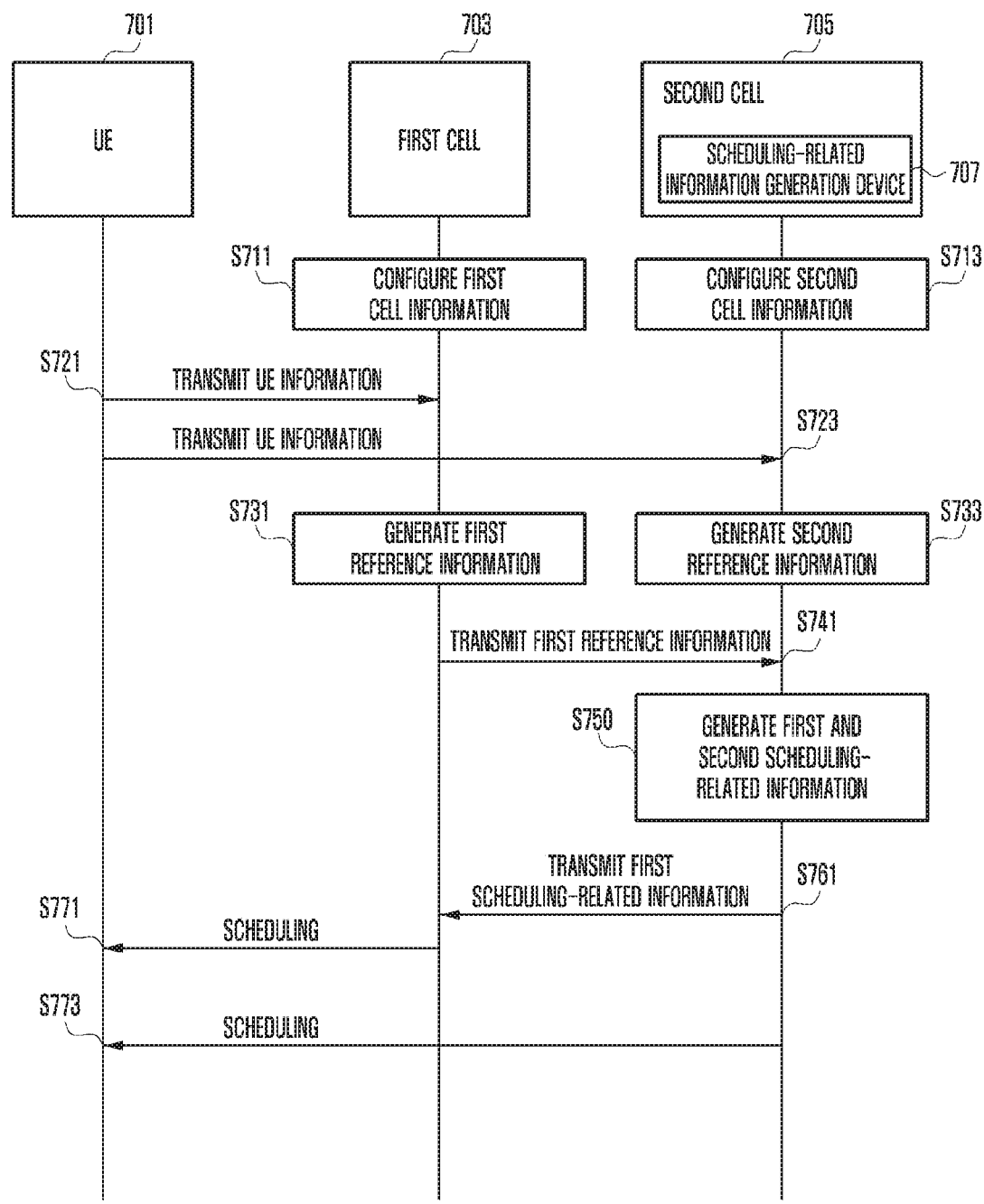

METHOD AND APPARATUS FOR SCHEDULING TERMINAL IN WIRELESS COMMUNICATION SYSTEM

TECHNICAL FIELD

The present invention relates to a wireless communication system and, in particular, to a method for scheduling a terminal performing uplink transmission over multiple carriers simultaneously in a long term evolution (LTE) system.

BACKGROUND ART

In order to meet the increasing demand for wireless data traffic since the commercialization of $4^{th}$ generation (4G) communication systems, the development focus is on the $5^{th}$ generation (5G) or pre-5G communication system. For this reason, the 5G or pre-5G communication system is called a beyond 4G network communication system or post long-term evolution (LTE) system.

Implementation of the 5G communication system in millimeter wave (mmWave) frequency bands (e.g., 60 GHz bands) is being considered to accomplish higher data rates. In order to increase the propagation distance by mitigating propagation loss in the 5G communication system, discussions are underway about various techniques such as beamforming, massive multiple-input multiple output (MIMO), full dimensional MIMO (FD-MIMO), array antenna, analog beamforming, and large-scale antenna.

Also, in order to enhance network performance of the 5G communication system, developments are underway of various techniques such as evolved small cell, advanced small cell, cloud radio access network (RAN), ultra-dense network, device-to-device (D2D) communication, wireless backhaul, moving network, cooperative communication, coordinated multi-points (CoMP), and interference cancellation.

Furthermore, the ongoing research includes the use of hybrid frequency shift keying (FSK) and quadrature amplitude modulation (QAM) {FQAM} and sliding window superposition coding (SWSC) as advanced coding modulation (ACM), filter bank multi-carrier (FBMC), non-orthogonal multiple access (NOMA), and sparse code multiple access (SCMA).

With the rapid advance of wireless communication technology, the communication systems have evolved to the $4^{th}$ Generation mobile communication systems represented by the LTE system. The LTE system employs several key technologies to meet the ever-increasing traffic demand, and carrier aggregation is one of such technologies. Carrier aggregation is a technology to increase the data rate between a terminal (hereinafter, referred to as User Equipment or UE) and a base station (hereinafter, referred to as evolved Node B or eNB) in such a way of using one or more secondary carriers in addition to a primary carrier, unlike the use of a single carrier in the legacy communication technology, the data rate increasing in proportion to the number of carriers. In LTE, the primary and secondary carriers are referred to as primary cell (PCell) and secondary cell (SCell), respectively.

Meanwhile, in the case of using the carrier aggregation technology in uplink, the difference in frequency-specific propagation characteristics and difference in antennas are likely to cause differences in carrier-specific pathloss, channel conditions, and reception signal quality at the base station. There is therefore a need of a method for allocating resources, controlling power, and distributing traffic efficiently in adaptation to carrier-specific channel conditions to improve resource utilization efficiency and the uplink data rate of a terminal.

DISCLOSURE OF INVENTION

Technical Problem

The present invention has been conceived to solve the above problems. The present invention aims to provide a method and apparatus for exchanging information among independent single-uplink carrier schedulers and performing per-carrier resource allocation and power control and traffic distribution.

Solution to Problem

In accordance with an aspect of the present invention, a scheduling-related information generation method of a scheduling-related information generation device in a wireless communication system includes receiving first reference information and second reference information, generating first scheduling-related information based on the received first and second reference information and second scheduling-related information in consideration of the first scheduling-related information, and transmitting the first scheduling-related information to a first cell and the second scheduling-related information to a second cell.

In accordance with another aspect of the present invention, a device for generating scheduling-related information in a wireless communication system includes a communication unit configured to communicate with other network entities and a controller configured to control to receive first reference information and second reference information, generate first scheduling-related information based on the received first and second reference information and second scheduling-related information in consideration of the first scheduling-related information, and transmit the first scheduling-related information to a first cell and the second scheduling-related information to a second cell.

Advantageous Effects of Invention

The present invention is advantageous in terms of distributing traffic load to multiple cells and improving resource utilization efficiency and uplink data rate of a UE through information exchange among single uplink carrier schedulers, per-carrier resource allocation and power control, and traffic distribution.

BRIEF DESCRIPTION OF DRAWINGS

FIG. 6 is a signal flow diagram illustrating a method for scheduling a UE according to another embodiment of the present invention;

FIG. 7 is a signal flow diagram illustrating a method for scheduling a UE according to another embodiment of the present invention;

MODE FOR THE INVENTION

Figure 1:
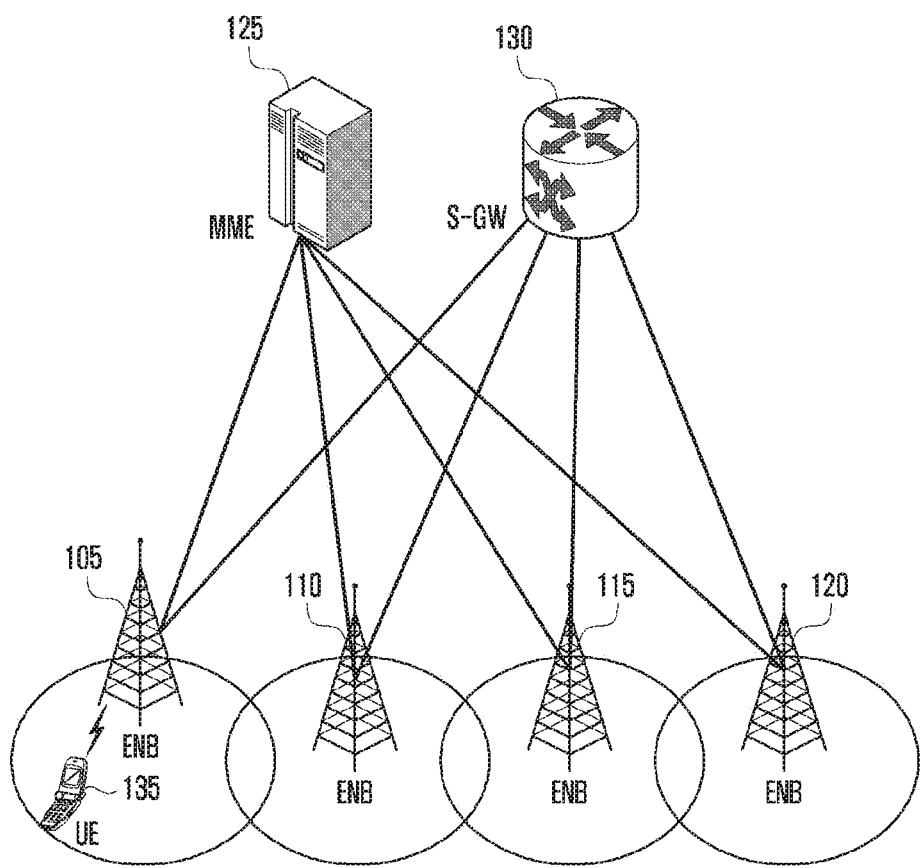
FIG. 1 is a diagram illustrating architecture of an LTE system to which the present invention is applied.

Exemplary embodiments of the present invention are described in detail with reference to the accompanying drawings. The same reference numbers are used throughout the drawings to refer to the same or like parts. Detailed descriptions of well-known functions and structures incorporated herein may be omitted to avoid obscuring the subject matter of the present invention.

Detailed descriptions of technical specifications well-known in the art and unrelated directly to the present invention may be omitted to avoid obscuring the subject matter of the present invention. This aims to omit unnecessary description so as to make clear the subject matter of the present invention.

For the same reason, some elements are exaggerated, omitted, or simplified in the drawings and, in practice, the elements may have sizes and/or shapes different from those shown in the drawings. Throughout the drawings, the same or equivalent parts are indicated by the same reference numbers.

Advantages and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these exemplary embodiments are provided so that this invention will be thorough and complete and will fully convey the concept of the invention to those skilled in the art, and the present invention will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time or may be performed in reverse order according to their functions.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

FIG. 1 is a diagram illustrating architecture of an LTE system to which the present invention is applied.

In reference to FIG. 1, a radio access network 100 of the LTE system includes evolved Node Bs (hereinafter, interchangeably referred to as eNB, node B, and base station) 105, 110, 115, and 120; a mobility management entity (MME) 125; and a serving gateway (S-GW) 130. A user terminal (hereinafter, interchangeably referred to as user equipment (UE) and terminal) 135 connects to an external network via the eNBs 105, 110, 115, and 120 and the S-GW 130.

The eNBs 105, 110, 115, and 120 correspond to the legacy node Bs of the universal mobile telecommunications system (UMTS). The UE 135 connects to one of the eNBs via a radio channel, and the eNB has more complex functions than the legacy node B. In the LTE system where all user traffic including real time services such as Voice over IP (VoIP) is served through shared channels, it is necessary to schedule UEs based on scheduling information such as buffer status, power headroom status, and channel status collected from the UEs, and an eNB serving the UEs takes charge of this function. Typically, one eNB operates multiple cells. For example, the LTE system adopts Orthogonal Frequency Division Multiplexing, (OFDM) as a radio access technology to secure a data rate of up to 100 Mbps in a bandwidth of 20 MHz. The LTE system also adopts Adaptive Modulation and Coding (AMC) to determine the modulation scheme and channel coding rate in adaptation to the channel condition of the UE. The S-GW 130 handles data bearer functions to establish and release data bearers under the control of the MIME 125. The MME 125 handles various control functions for the UE as well as the mobile management function and has connections with the eNBs.

Figure 2A:
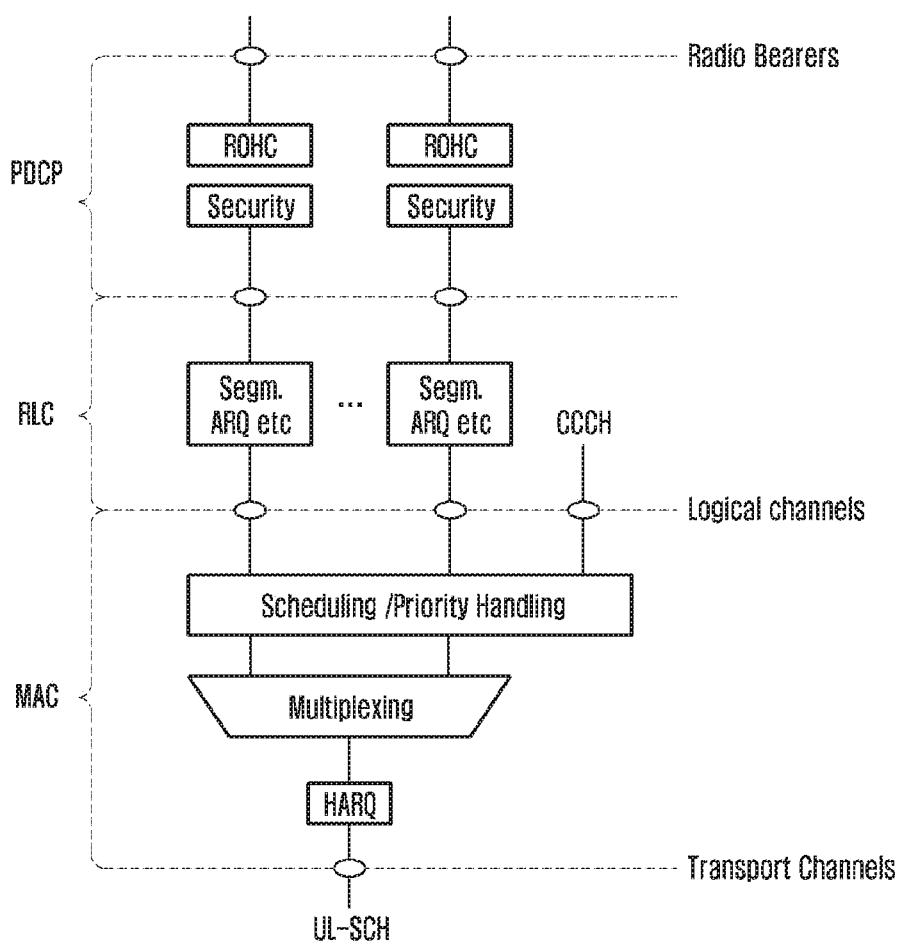
FIG. 2A is a diagram illustrating single-carrier uplink protocol stack architecture of an LTE system to which the present invention is applied.

FIG. 2A is a diagram illustrating single-carrier uplink protocol stack architecture of an LTE system to which the present invention is applied.

In reference to FIG. 2A, the LTE radio protocol stack architecture includes a packet data convergence protocol (PDCP) layer, a radio link control (RLC) layer, and a medium access control (MAC) layer on the UE and the eNB. The PDCP layer at the top-most layer of the radio protocol stack takes charge of processing control signals and Internet protocol (IP) data packets and compressing/decompressing headers of data packets, and the RLC layer interposed between the PDCP layer and the MAC layer takes charge of reformatting PDCP packet data units (PDUs) to an appropriate size. That is, the RLC layer is responsible for segmenting a PDCP PDU into smaller sizes that fit the RLC PDU size, arranging the RLC PDUs, reassembling RLC PDUs, and retransmitting lost packets. The MAC layer interposed between the RLC layer and the PHY layer takes charge of data scheduling, multiplexing/demultiplexing multiple logical channels per user, and hybrid automatic retransmission request (HARQ) function. In detail, the MAC layer allows for connection of multiple RLC entities established for one UE and takes charge of multiplexing RLC PDUs into a MAC PDU and demultiplexing a MAC PUD into RLC PDUs. The PHY layer takes charge of channel-coding and modulation on higher layer data to generate and transmit OFDM symbols over a radio channel, and demodulating and channel-decoding on OFDM symbols received over the radio channel to deliver the decoded data to the higher layers. The PHY layer also perform the HARQ for additional error correction in such a way that the receiver transmits 1-bit information indicating positive or negative acknowledgement about a data packet. The 1-bit information is referred to as acknowledgement/negative acknowledgement (ACK/NACK). The downlink HARQ ACK/NACK corresponding to an uplink transmission may be transmitted in a physical Hybrid-ARQ Indicator Channel (PHICH), and the uplink HARQ ACK/NACK corresponding to a downlink transmission may be transmitted in a Physical Uplink Control Channel (PUCCH) or Physical Uplink Shared Channel (PUSCH).

Figure 2B:
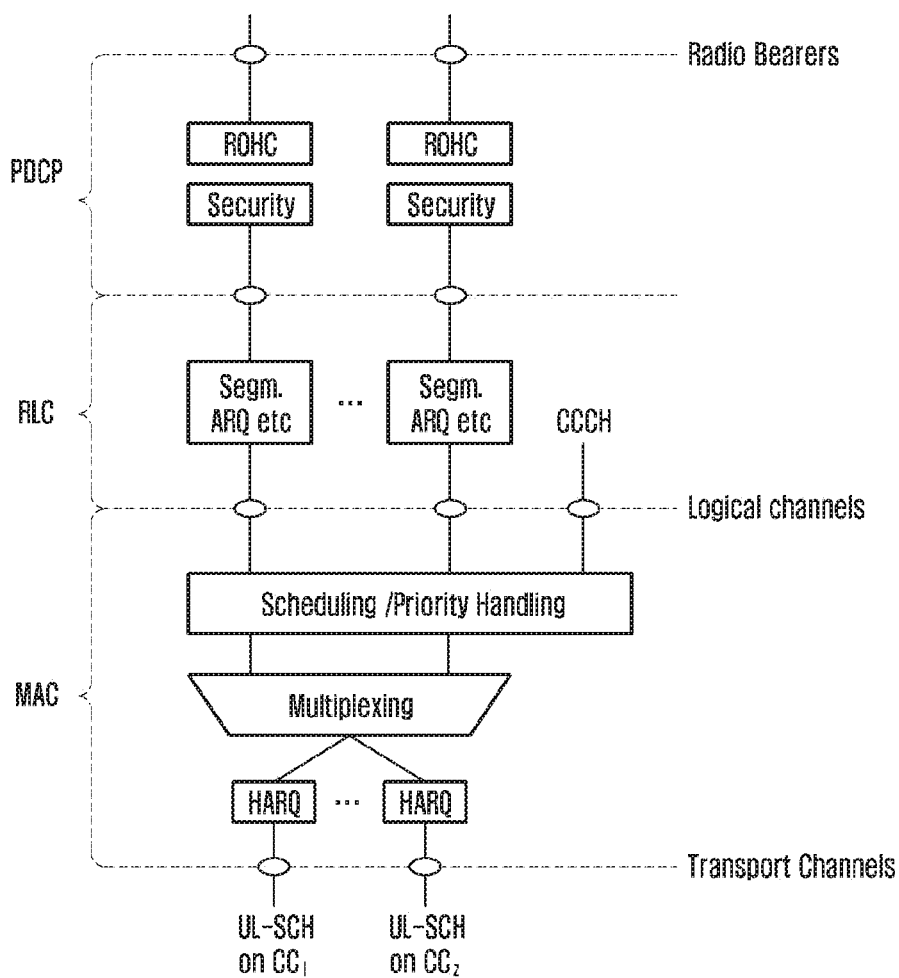
FIG. 2B is a diagram illustrating single-carrier uplink protocol stack architecture for supporting a carrier aggregation technique in an LTE system to which the present invention is applied.

FIG. 2B is a diagram illustrating single-carrier uplink protocol stack architecture for supporting a carrier aggregation technique in an LTE system to which the present invention is applied.

In reference to FIG. 2B, the uplink carrier aggregation technique is characterized by modifying the MAC layer for handling uplink carrier aggregation while maintaining the PDCP, RLC, and PHY layers without any modification in order to support backward compatibility with legacy technologies. The RLC layer maintains a single buffer in both using a single uplink carrier and aggregating uplink carriers regardless of the number of uplink carriers, and the MAC layer performs scheduling on multiple uplink carriers and delivers the packets received over the individual uplink carriers to the RLC layer in the uplink carrier aggregation mode.

Figure 3:
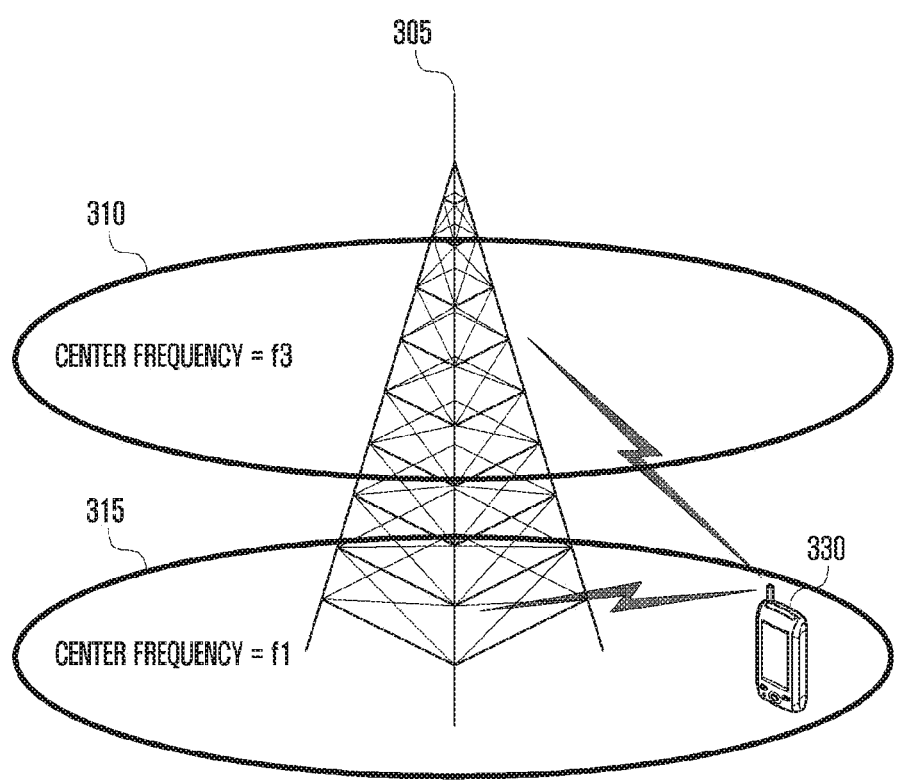
FIG. 3 is a diagram for explaining carrier aggregation at a UE.

FIG. 3 is a diagram for explaining carrier aggregation at a UE.

In reference to FIG. 3, an eNB transmits and receives signals through multiple carriers across a plurality of frequency bands. For example, when the eNB 305 is configured to use the downlink carrier 315 with center frequency f1 and the downlink carrier 310 with center frequency f3, the conventional UE 330 receives data on one of the two carriers. However, the CA-enabled UE (or multi-frequency UE) is capable of transmitting/receiving data on multiple carriers simultaneously. The eNB 305 may allocate extra carriers to the CA-enabled UE 330 to increase a data rate of the UE 330 depending on the situation. Assuming that a cell is configured with one downlink carrier and one uplink carrier of an eNB in the conventional concept, the carrier aggregation can be understood as if the UE communicates data via multiple cells. The carrier-aggregation makes it possible to increase the peak data rate in proportion to the number of aggregated carriers.

In the following description, if a UE receives data through an arbitrary downlink carrier or transmits data through an arbitrary uplink carrier, this means to receive or transmit data through control and data channels provided in cells corresponding to center frequencies and frequency bands characterizing the carriers. Although the description is directed to a LTE system for convenience of explanation, the present invention is applicable to other wireless communication systems supporting a carrier aggregation technique.

Figure 4:
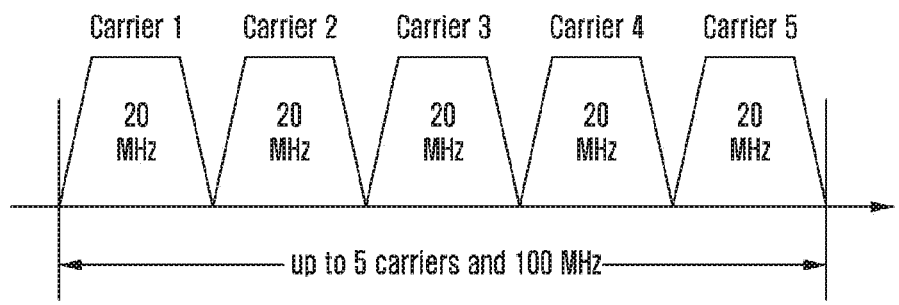
FIG. 4 is a diagram for further explaining carrier aggregation at a UE.

FIG. 4 is a diagram for explaining carrier aggregation.

The carrier aggregation is a technique for increasing the data rate of a UE for broadband transmission by aggregating two or more component carries, and it has been adopted to the $3^{rd}$ generation partnership project (3GPP) high speed packet access (HSPA) and LTE as cellular mobile communication standards. The LTE carrier aggregation technique can aggregate up to 5 carriers to achieve the maximum bandwidth of 100 MHz and each of the aggregated carriers is compatible with that of the legacy single carrier communication to support the terminal operating on a signal carrier. The carrier aggregation technique is advantageous in terms of increasing data rate efficiently by reusing the legacy LTE system in a situation where it is difficult for the mobile communication service providers to obtain consecutive bands to secure a bandwidth broader than 20 MHz, flexible installation, backward capability with legacy technologies, per-carrier network administrations, and facilitating heterogeneous network implementation.

Meanwhile, according to the LTE standard, a UE can transmit a buffer status report (BSR) and per-uplink carrier power headroom report (PHR) over any of the carriers depending on the scheduling situations of per-carrier uplink schedulers. In this case, it may occur that the BSR and PHR transmission is biased to a certain carrier and, because of this, the uplink schedulers of the carriers over which no BSR and PHR information is received for a long time are likely to perform uplink scheduling operations based on incorrect BSR and PHR information.

Thus, there is a need of sharing scheduling-related information including BSR and PHR information among the single uplink carrier schedulers for efficient uplink carrier aggregation scheduling mode.

According to the LTE standard, the configured maximum possible output power (Pcmax) of the terminal for all carriers is fixed to a predetermined value per UE class. Accordingly, in the case where a UE transmits data over multiple carriers, the configured maximum possible output power should be divided. However, if the output power is divided at a constant ratio or into fixed sizes, this may cause failure to achieve the maximum performance gain expected with the uplink carrier aggregation scheduling and even performance degradation in comparison with the single uplink carrier scheduling because of difference in carrier-specific pathloss, channel conditions, and reception signal quality at the eNB that are affected by a difference in frequency-specific propagation characteristics and difference in antennas. There is therefore a need to share electric power and transmit power control-related information among the single uplink carrier schedulers and control per-uplink carrier transmit powers based on the shared information to maximize UE performance through uplink carrier aggregation scheduling.

In the case where multiple uplink carriers exist, the buffer occupancy (BO) of a certain terminal that is updated based on the BSR and uplink scheduling information is divided among the respective carriers. The BO may mean the information related to the data amount stored in the UE. Accordingly, the BO may be divided among the carriers according to the data amount to be transmitted over individual carriers.

The per-carrier uplink scheduler may perform scheduling by packet size equal to or less than the BO allocated to the corresponding carrier. A scheduled UE may read out a packet in the corresponding size to generate and transmit a MAC layer packet. Here, the packet size for real transmission over each uplink carrier varies depending on the per-carrier data rate dependent on the UE's channel condition, bandwidth and traffic load of a cell per the uplink carrier, and available resource amount and transmit power of the corresponding UE. Accordingly, if the BO of a UE is divided at a constant ratio or into fixed sizes, this may cause failure to achieve maximum performance gain expected with the uplink carrier aggregation scheduling and even performance degradation in comparison with the single uplink carrier scheduling. There is therefore a need to share information on the per-uplink carrier available data rates or available average resource amounts in the cells corresponding to the individual uplink carriers (i.e., amount of resources obtained by subtracting the average resources use amount from the total available resources amount) among the single uplink carrier schedulers and divide the BO among the uplink carriers based on the shared information.

Figure 5:
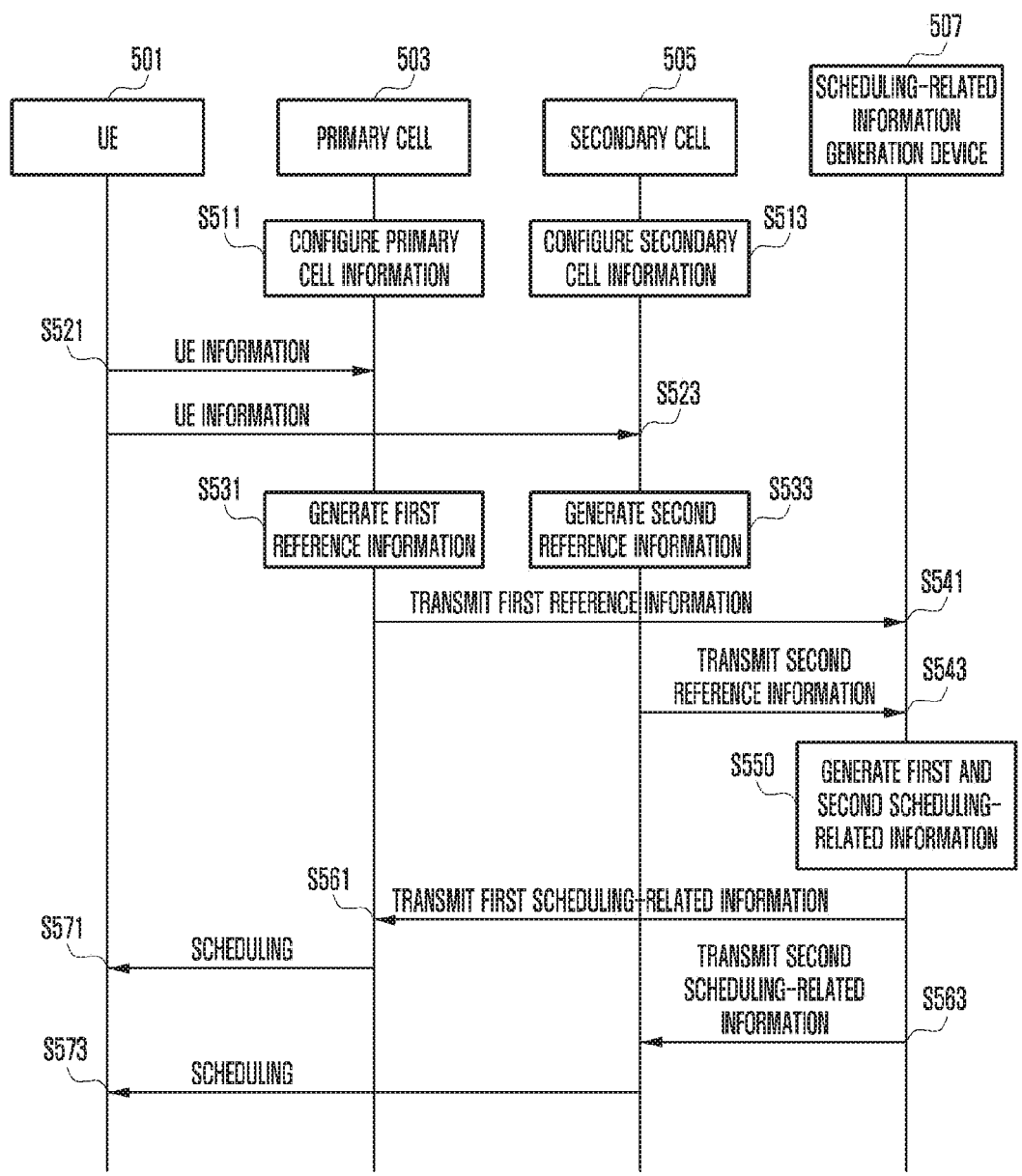
FIG. 5 is a signal flow diagram illustrating a method for scheduling a UE according to an embodiment of the present invention.

FIG. 5 is a signal flow diagram illustrating a method for scheduling a UE according to an embodiment of the present invention.

Although the description is directed to a case where a scheduling-related information generation device transmits scheduling-related information of two uplink carriers over the corresponding carriers, for convenience of explanation, the present invention is not limited thereto. That is, the method of the present invention is applicable to the case where two or more scheduling-related information generation devices allocate resources of two or more uplink carriers to UEs. For example, a plurality of cells have respective scheduling generation devices, and the per-cell scheduling generation devices may share UE information and reference information to generate per-cell scheduling-related information. It may also be possible for the schedulers of the eNBs hosting the cells, instead of the separately implemented scheduling-related information generation devices, to perform the operations of the present invention.

In the following description, the term "first cell" may denote a cell operating on a primary carrier, and the term "second cell" may denote a cell operating on a secondary carrier. In the following description, the carrier in use by the first cell may be referred to as first carrier, and the carrier in use by the second cell may be referred to as second carrier.

In reference to FIG. 5, the first cell 503 may configure first cell information at step S511. The second cell 505 may configure second cell information at step S513.

The cell information may include at least one of cell configuration information, bandwidth in use by the eNB, a number of maximum allocation-available PUSCH resource blocks (RBs), uplink scheduling information, channel quality information, cell load information, predetermined priority information, bearer configuration information, and power offset information. The cell information may be obtained in such a way of being shared among the cells. The information contained in the cell information may be obtained from UE report information or computed based on the UE report information. However, the scope of the present invention is not limited thereto, and the cell information may include other information.

The UE 501 may transmit the UE information to the first and second cells 503 and 505 at steps S521 and S523, respectively.

The UE information may include at least one of BSR and PHR. The UE may transmit channel status information for use in generating cell information to the respective cells. Each eNB may receive the UE information before configuring the cell information. However, the scope of the present invention is not limited thereto, and the UE information may include other information that the UE reports to the eNB.

Each cell may generate reference information necessary for generating scheduling-related information. The first cell 530 may generate, at step S531, first reference information necessary for generating the first scheduling-related information. The second cell 505 may generate, at step S533, second reference information necessary for generating the second scheduling-related information.

Here, each cell may generate the reference information based on the cell information or UE information. In detail, each cell may include the cell information or UE information in the reference information without any modification. Each cell may include parameters generated based on the cell information or the UE information in the reference information. For example, the parameters may include a power offset value and metric information as electric field information of the first carrier. The parameters being included in the reference information are not limited thereto, and detailed descriptions of the parameters included in the reference information and their roles are made later.

The first cell 503 may transmit the first reference information to the scheduling-related information generation device 507 at step S541. The second cell 505 may transmit the second reference information to the scheduling-related information generation device 507 at step S543.

The scheduling-related information generation device 507 may generate the first and second scheduling-related information at step S550. The scheduling-related information generation device 507 may receive the first and second reference information and generate the first and second scheduling-related information based on the first and second reference information, respectively.

In the present invention, the scheduling-related information may include power allocation information and BO allocation information.

As described above, the maximum power of a UE is determined depending on the UE-. If the UE is scheduled on multiple carriers, the sum of the transmit powers for transmitting packets on the individual carriers should be in the range of the maximum possible output power. The power allocation information may denote the information on the powers allocated for packet transmission on the carrier resources.

As described above, the amount of data stored in the UE is referred to as BO. The BO allocation information may denote the information on the amounts of data to be transmitted on the individual carrier resources in the case where the UE is scheduled on a plurality of carriers.

The present invention relates to UE scheduling in uplink carrier aggregation mode under the assumption that the maximum possible output power of a UE and maximum transmittable data amount of the UE are limited. If one of the first and second scheduling-related information is determined, the other scheduling-related information may be affected by the determined scheduling-related information.

The scheduling-related information generation device 507 may determine the first scheduling-related information and then the second scheduling-related information based on the first scheduling-related information. The scheduling-related information generation device 507 may also determine the second scheduling-related information and then the first scheduling-related information based on the second scheduling-related information. However, it may be preferred for the scheduling-related information generation device to determine the scheduling-related information of the cell operating on the primary carrier first and then the scheduling-related information of the cell operating on the secondary carrier.

In detail, if the first scheduling-related information is determined, the scheduling-related information generation device may determine the second power allocation information by subtracting the first power allocation information included in the first scheduling-related information from the power information available to the UE. It may also be possible for the scheduling-related information generation device to determine the second BO allocation information by subtracting the first BO allocation information included in the first scheduling-related information from the BO of the UE. As a consequence, the scheduling-related information generation device may determine the second scheduling-related information including the second power allocation information and the second BO allocation information based on the first scheduling-related information.

For example, it is supposed that the maximum possible output power of the UE is 23 dBm. In this case, if the power allocation information for packet transmission over the first carrier is determined as 20 dBm, the scheduling-related information generation device 507 may determine the power allocation information for packet transmission over the second carrier as 3 dBm.

For example, it is supposed that the BO of the UE is 20, i.e., the amount of data stored in the buffer of the UE is 20. In this case, if the amount of data to be transmitted (BO allocation information) over the first carrier is determined as 13, the amount of data to be transmitted (BO allocation information) over the second carrier may be determined as 7.

That is, the first scheduling-related information for the first cell and the second scheduling-related information for the second cell may be correlated in the present invention.

The scheduling-related information generation device 507 may transmit the first scheduling-related information to the first cell at step S561. The scheduling-related information generation device 507 may also transmit the second scheduling-related information to the second cell at step S563.

At step S571, the first cell may schedule the UE based on the first scheduling-related information. At step S573, the second cell may schedule the UE based on the second scheduling-related information.

FIG. 6 is a signal flow diagram illustrating a method for scheduling a UE according to another embodiment of the present invention.

FIG. 6 depicts a case where a scheduling-related information device is included in a first cell operating on a primary carrier.

The first cell 603 may configure first cell information at step S611. A second cell 605 may configure second cell information at step S613.

The first and second cells may receive UE information from a UE 601 at steps S621 and S623, respectively. The description of cell information and UE information has been made with reference to FIG. 5 and thus is omitted herein.

The cells may generate reference information necessary for generating scheduling-related information. In detail, the first cell 603 may generate, at step S631, first reference information necessary for generating first scheduling-related information. Also, the second cell 605 may generate, at step S633, second reference information necessary for generating second scheduling-related information.

As described above, the reference information may be generated based on the cell information or UE information. The detailed description thereof has been made above and thus is omitted herein.

The first cell 603 may transmit the first reference information to the scheduling-related information generation device 607. In this embodiment, however, the first cell may not need to transmit the first reference information because the scheduling-related information generation device 607 is included in the first cell. Even though the first cell does not transmit the first reference information, the scheduling-related information generation device 607 may check the first reference information generated by the first cell.

At step S643, the second cell 605 may transmit the second reference information to the scheduling-related information generation device 607 included in the first cell.

At step S650, the scheduling-related information generation device 607 may generate the first and second scheduling-related information based on the first and second reference information.

The scheduling-related information generation device 607 may determine the first scheduling information and then the second scheduling-related information based on the first scheduling-related information. The detailed description thereof has been made with reference to FIG. 5 and thus is omitted herein.

After generating the first and second scheduling-related information, the scheduling-related information generation device 607 may transmit the first scheduling-related information to the first cell 603. The scheduling-related information generation device 607 may also transmit the second scheduling-related information to the second cell at step S663.

However, the scheduling-related information generation device 607 may not transmit the first scheduling-related information to the first cell because the scheduling-related information generation device 607 is included in the first cell 603 and, even in this case, the first cell may check the first scheduling-related information.

Then, the first cell-may schedule the UE based on the first scheduling-related information at step S671. The second cell may also schedule the UE based on the second scheduling-related information at step S673.

FIG. 7 is a signal flow diagram illustrating a method for scheduling a UE according to another embodiment of the present invention.

FIG. 7 depicts a case where a scheduling-related information device is included in a second cell operating on a secondary carrier.

A first cell 703 may configure first cell information at step S711. The second cell 705 may configure second cell information at step S713.

The first and second cells may receive UE information from a UE at steps S721 and S723, respectively.

The cells may generate reference information necessary for generating scheduling-related information. In detail, the first cell 703 may generate, at step S731, first reference information necessary for generating first scheduling-related information. Also, the second cell 705 may generate, at step S733, second reference information necessary for generating second scheduling-related information.

As described above, the reference information may be generated based on the cell information or UE information. The detailed description thereof has been made above and thus is omitted herein.

At step S741, the first cell 703 may transmit the first reference information to the scheduling-related information generation device 707 included in the first cell 705.

The second cell 705 may transmit the second reference information to the scheduling-related information generation device 707. In this embodiment, however, the second cell may not need to transmit the second reference information because the scheduling-related information generation device 707 is included in the second cell. Even though the second cell does not transmit the second reference information, the scheduling-related information generation device 707 may check the second reference information generated by the second cell.

At step S750, the scheduling-related information generation device 707 may generate the first and second scheduling-related information based on the first and second reference information.

The scheduling-related information generation device 707 may determine the first scheduling-related information and then the second scheduling-related information based on the first scheduling-related information. The detailed description thereof has been made with reference to FIG. 5 and thus is omitted herein.

After generating the first and second scheduling-related information, the scheduling-related information generation device 707 may transmit the first scheduling-related information to the first cell 703 at step S761. After generating the first and second scheduling-related information, the scheduling-related information generation device 707 may also transmit the second scheduling-related information to the second cell 705. However, the scheduling-related information generation device 707 may not transmit the second scheduling-related information to the second cell because the scheduling-related information generation device 707 is included in the second cell 705 as described above and, even in this case, the first cell may check the second scheduling-related information.

Then, the first cell may schedule the UE based on the first scheduling-related information at step S771. The second cell may also schedule the UE based on the second scheduling-related information at step S773.

Figure 8A:
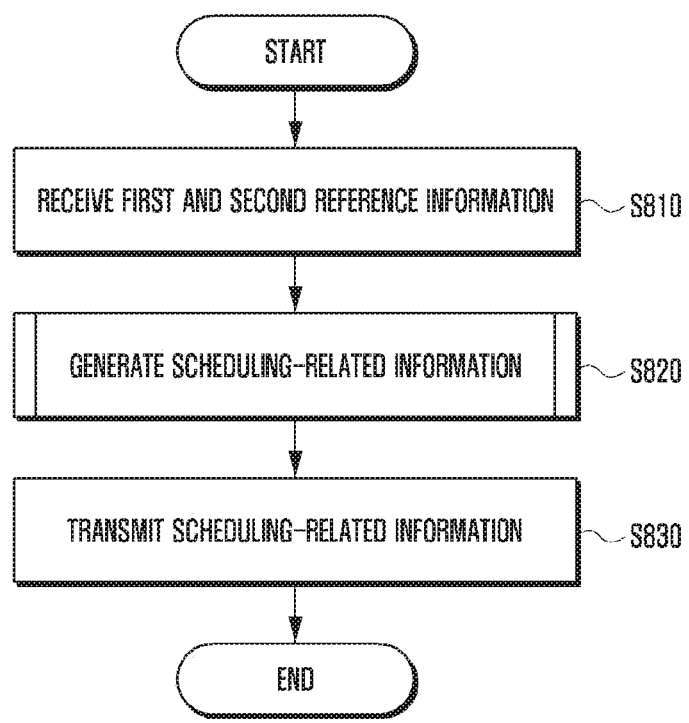
FIG. 8A is a flowchart illustrating a procedure for a scheduling-related information generation device to generate scheduling-related information according to an embodiment of the present invention.

FIG. 8A is a flowchart illustrating a procedure for a scheduling-related information generation device to generate scheduling-related information according to an embodiment of the present invention.

In reference to FIG. 8A, the scheduling-related information generation device may receive first and second reference information at step S810. The first reference information, which is generated by a first cell, may include the information on the first eNB or first cell. The first reference information may include the information included in at least one of information included in the first cell information and UE information. For example, the first reference information may include at least one of cell information (such as cell configuration information, uplink scheduling information, bearer configuration information, per-carrier channel quality information, per-carrier load, and priority information of the first cell) and UE information (such as BSR and PHR).

The first reference information may include parameters calculated based on the first cell information or UE information. For example, if the carrier in use by the first cell is the primary carrier, the first reference information may include metric information as electric field information (PcellMetric) of the primary carrier, threshold value information (PcellThre) of the electric field information, and margin value information (PcellMetric Margin) of the electric field information, and the parameters may be the information calculated or analogized from the first cell information or UE information or included in the first cell information or UE information.

The first reference information may include variable information including at least one of an uplink data rate for the primary carrier, a cell-specific available average uplink resource use amount, and a predetermined constant. Likewise, the uplink data rate or the available average uplink resource use amount may be the information calculated or analogized from the first cell information or UE information or included in the first cell information or UE information.

The second reference information, which is generated by the second cell, may denote the information related to the second eNB or second cell. The second reference information may include the information included in at least one of the second cell information and UE information. For example, the second reference information may include at least one of cell information (such as cell configuration information, uplink scheduling information, bearer configuration information, per-carrier channel quality information, per-carrier load, and priority information of the second cell) and UE information (such as BSR and PHR).

The second reference information may include parameters generated based on the second cell information or UE information. For example, if the carrier in use by the second cell is the secondary carrier, the second reference information may include metric information (ScellMetric) and threshold value information (ScellThre) of the secondary carrier and margin value information (ScellMetric Margin) of the ScellMetric, and the parameters may be the information calculated or analogized from the second cell information or UE information or included in the second cell information or UE information.

The second reference information may include variable information including at least one of an uplink data rate for the secondary carrier, a cell-specific available average uplink resource use amount, and a predetermined constant.

Likewise, the uplink data rate or the available average uplink resource use amount may be the information calculated or analogized from the second cell information or UE information or included in the second cell information or UE information.

The scheduling-related information generation device may generate, at step S820, the scheduling-related information based on the first and second reference information. The scheduling-related information generation device may generate the first scheduling-related information for transmission to the first cell and the second scheduling-related information for transmission to the second cell.

The scheduling-related information may include power allocation information and BO allocation information. The scheduling-related information generation device may calculate the power allocation information based on the first and second reference information. The scheduling-related information generation device may calculate the per-cell BO allocation information based on the first and second reference information and calculate power allocation information.

As described above, the first and second scheduling-related information may be correlated. The procedure for calculating the scheduling-related information is described later in detail.

The scheduling-related information generation device may transmit the scheduling-related information at step S830. In detail, the scheduling-related information generation device may transmit the first and second scheduling-related information to the first and second cells, respectively, at step S830.

The eNB hosting each cell may schedule the UE based on the received scheduling-related information.

A description is made of the method for determining the power allocation information and BO information being included in the scheduling-related information in detail hereinafter.

Figure 8B:
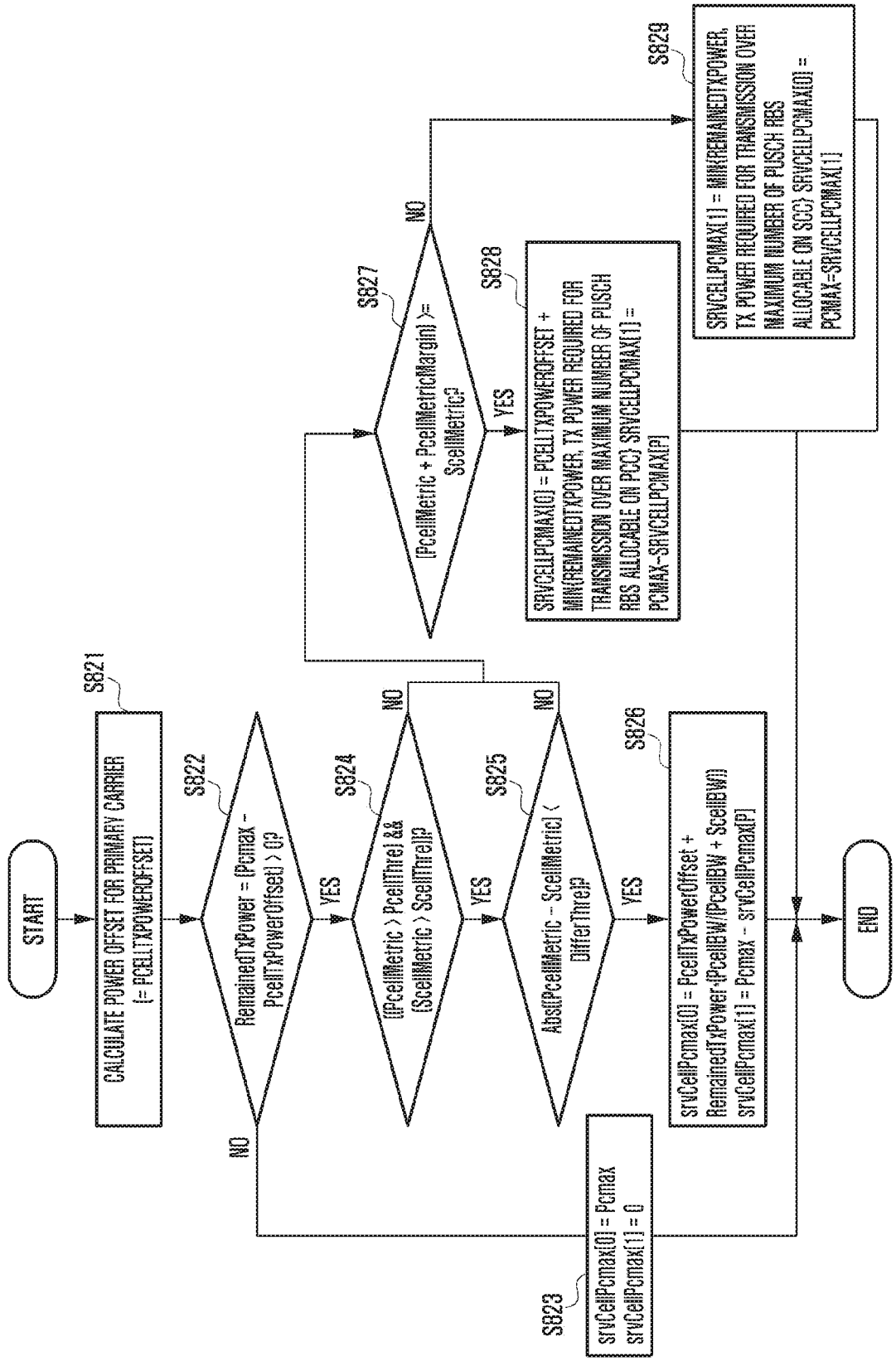
FIG. 8B is a flowchart illustrating a procedure for determining power allocation information according to an embodiment of the present invention.

FIG. 8B is a flowchart illustrating a procedure for determining power allocation information according to an embodiment of the present invention.

The scheduling-related information generation device may calculate first carrier transmit power offset (PcellTxPowerOffset) at step S821. Although this embodiment is directed to the case where a first carrier is the primary carrier for convenience of explanation, the present invention is not limited thereto. The transmit power offset may be included in the first reference information, and if the first reference information includes the transmit power offset, the scheduling-related information generate device may omit step S821.

The scheduling-related information generation device may calculate remaining transmit power (RemainedTxPower) at step S821 and determine whether the remaining transmit power is greater than 0. The scheduling-related information generation device may calculate the remaining transmit power by subtracting the transmit power offset from the maximum possible output power (Pcmax) of the UE. Here, the Pcmax may be transmitted to the scheduling-related information generation device in the first reference information. The remaining transmit power is used for the following reason.

The control information and delay sensitive information such as VoLTE information may be transmitted over the primary carrier even when the uplink carrier aggregation technique is being used. Accordingly, in order to guarantee transmission of the information, a scheduler has to allocate a predetermined power value to the UE for use of the primary carrier, the predetermined power value being called transmit power offset. The scheduling-related information generation device determines the power allocation information to divide the remaining transmit power, as the remainder after excluding the transmit power offset, among multiple carriers. In the present invention, the expression "allocating power to or dividing power among carriers" may mean allocating or dividing the power for data transmission of the UE over the carriers at the powers allocated or divided thereto.

If it is determined that the remaining transmit power is less than 0, this may mean that the maximum possible output power of the UE is less than the transmit power offset. Accordingly, the scheduling-related information generation device may allocate, at step S823, the whole of the maximum possible output power of the UE for the primary carrier (srvCellPcmax[1]=Pcmax) and not allocate power for the secondary carrier (srvCellPcmax[S]=0). That is, the scheduling-related information generation device may configure such that the whole of the maximum possible output power of the UE is allocated for data transmission over the primary carrier.

Otherwise, if it is determined that the remaining transmit power is greater than 0, the scheduling-related information generation device may compare, at step S824, primary carrier electric field metric information (PcellMetric) and a primary carrier electric field metric threshold value (PcellThre) and the secondary carrier electric field metric information (ScellMetric) and a secondary carrier electric field metric threshold value. As described above, the PcellMetric and PcellThre are included in the first reference information and may mean the primary carrier electric field information and electric field information threshold value, respectively. Likewise, the ScellMetric and ScellThre are included in the second reference information and may mean the secondary carrier electric field information and electric field information threshold value, respectively. However, the metric information and threshold value information may also be included in the cell information.

If it is determined that the PcellMetric is greater than the PcellThre and ScellMetric is greater than ScellThre, the scheduling-related information generation device may compare the absolute value of the difference between the PcellMetric and ScellMetric with a difference threshold value (DifferThre) at step S825.

If it is determined that the PcellMetric is greater than PcellThre and the ScellMetric is greater than the ScellThre and that the absolute value of the difference between the PcellMetric and ScellMetric is less than DifferThre, this means that the channel conditions of the primary and secondary carriers are good and have no large difference. Accordingly, the scheduling-related information generation device may configure, at step S826, the powers for the UE to transmit data over the primary and secondary carriers according to the bandwidth ratio.

At step S826, the scheduling-related information generation device may divide the remaining transmit power according to the bandwidth ratio and allocate the transmit power corresponding to the sum of the transmit power corresponding to the bandwidth of the primary carrier and the power offset for the primary carrier. The scheduling-related information generation device may also allocate the transmit power remaining after power allocation for the primary carrier to the secondary carrier.

If it is determined that the calculated remaining transmit power is greater than 0 and if the condition of PcellMetric>PcellThre and ScellMetric>ScellThre or the condition of the absolute value of the difference between the PcellMetric and ScellMetric<DifferThre is not fulfilled, the scheduling-related information generation device may determine at step S827 whether the sum of the PcellMetric and the margin of the PcellMetric (PcellMetricMargin) is equal to or greater than ScellMetric.

If the channel condition of the primary carrier or the secondary carrier is bad and if the difference of the channel conditions of the primary and second channels is large, it is efficient to allocate a maximum transmit power of the carrier with the good channel condition preferentially for the corresponding carrier and then the remaining transmit power to the other carrier.

Accordingly, if it is determined that the sum of the PcellMetric and PcellMetricMargin is equal to or greater than the ScellMetric, the scheduling-related information generation device may allocate the maximum transmit power of the primary carrier at step S828. In detail, the scheduling-related information generation device may allocate the transmit power, which corresponds to a value obtained by adding PcellTxPowerOffset to the smallest one between the remaining transmit power and the transmit power required for all RBs corresponding to a maximum number of PUSCH RBs allocable on the primary carrier, to the primary carrier and then the remaining transmit power to the secondary carrier.

The reason for adding PcellMetricMargin is to allocate the transmit power to the primary carrier preferentially in the case where the electric field information difference between the primary and secondary carriers is not large. However, the PcellMetricMargin may be set to a negative number; in this case, if the electric field information difference between the primary and secondary carriers is not large, it may be possible to allocate transmit power for the secondary carrier preferentially. The PcellMetricMargin may be included in the first reference information.

If the condition of PcellMetric>PcellThre and ScellMetric>ScellThre or the condition of the absolute value of the difference between the PcellMetric and ScellMetric<DifferThre is not fulfilled and if the sum of the PcellMetric and PcellMetricMargin is less than ScellMetric, the scheduling-related information generation device may allocate, at step S829, the transmit power, which corresponds to the smallest value between the remaining transmit power (RemainedTxPower) and the transmit power for transmission over all RBs corresponding to the maximum number of PUSCH RBs allocable on the secondary carrier, to the secondary carrier and then the remaining transmit power to the primary carrier.

The power allocation information as the per-uplink carrier maximum available transmit power information may be transmitted to individual single-uplink carrier schedulers such that the single-uplink carrier schedulers may independently perform uplink transmit power control based on the received power allocation information.

Figure 8C:
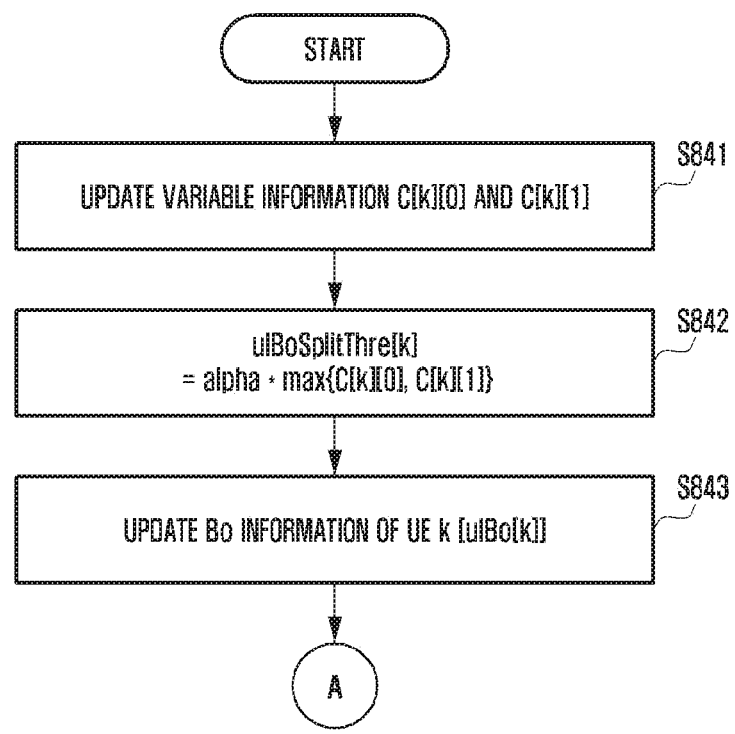
FIGS. 8C and 8D are a flowchart illustrating a buffer occupancy(BO) allocation information determination procedure according to an embodiment of the present invention.
Figure 8D:
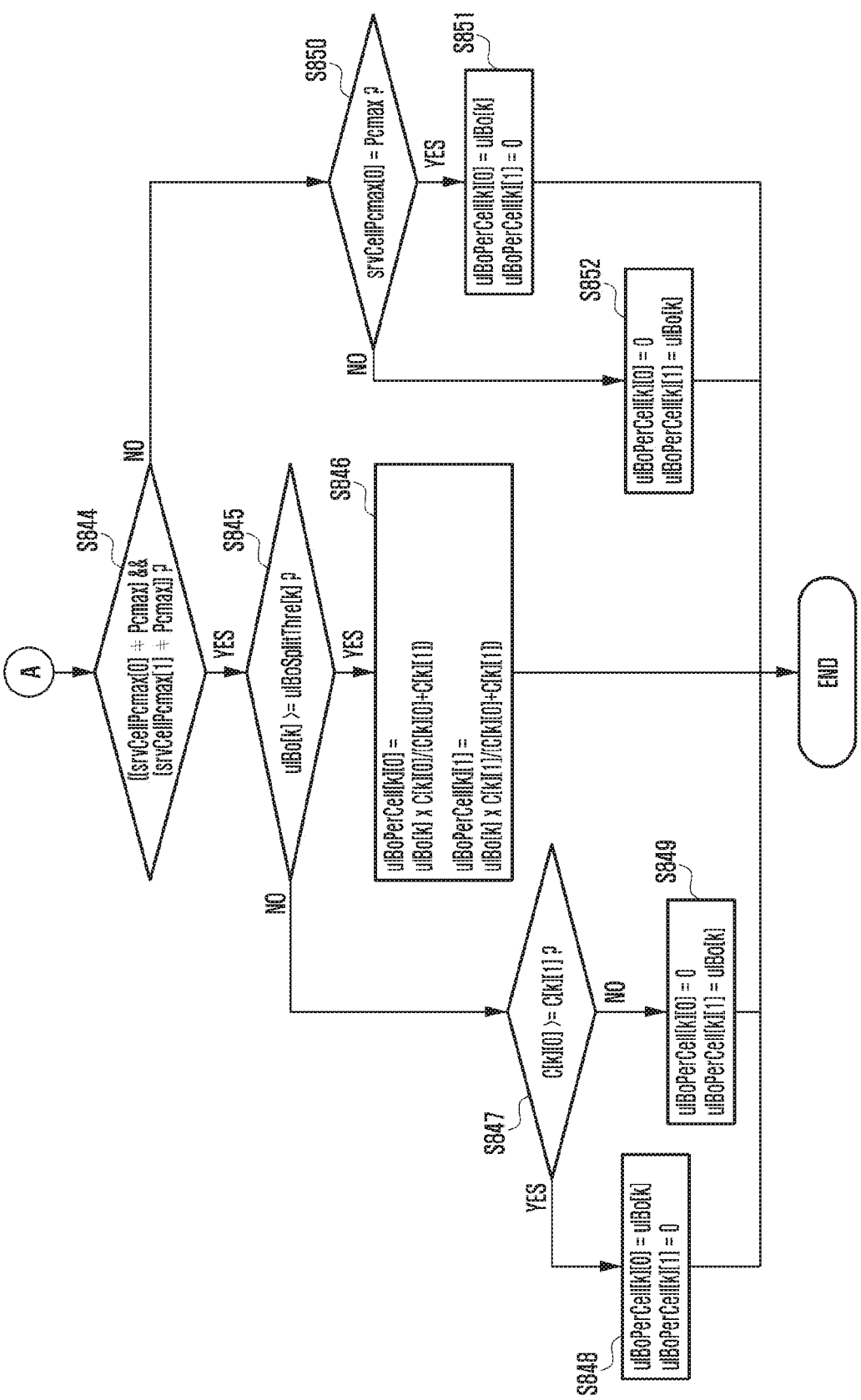

FIGS. 8C and 8D are a flowchart illustrating a BO allocation information determination procedure according to an embodiment of the present invention.

The scheduling-related information generation device may determine the BO allocation information based on the first and second reference information and calculated power allocation information.

The scheduling-related information generation device may receive variable information from the single uplink carrier schedulers operating on the respective first and second carriers and update the variable information at step S841.

Here, the variable information may include one of the following items.

1) Uplink data rates of a UE k for the first and second carriers adaptive to the channel conditions thereon 2) Average uplink resource use amounts of a UE k in cells corresponding to the first and second carriers (i.e., total resource amount—average resource use amount)

3) Arbitrary constants fixedly set in cells corresponding to the first and second carriers 4) Product or weight product of two or three (weighted) values of items 1), 2), and 3) per uplink carrier In this embodiment, the variable information for the UE k on the first carrier may be expressed as C[k][0], and the variable information for the UE k on the second carrier may be expressed as C[k][1].

After updating the variable information C[k][0] and C[k][1], the scheduling-related information generation device may calculate a BO threshold value (ulBoSplitThre[k]) for the UE k at step S842. Here, the buffer threshold value (ulBoSplitThre[k]) may be determined as a value obtained by multiplying the greatest one between C[k][0] and C[k][1] by an arbitrary constant "alpha."

After determining the buffer threshold value, the scheduling-related information generation device may update the BO information of the UE k (ulBo[k]) at step S843.

After updating the BO information, the scheduling-related information generation device may determine at step S844 whether the transmit power is allocated to the first and second carriers.

If it is determined that the transmit power is allocated to the first and second carriers, i.e., the single uplink carrier schedulers for the first and second carriers have respective maximum transmit powers (srvCellPcmax[P]≠Pcmax and srvCellPcmax[S]≠Pcmax), the scheduling-related information generation device may compare the BO of the UE with the buffer threshold value at step S845.

If it is determined that the BO of the UE is equal to or greater than the buffer threshold value (ulBoSplitThre[k]), the scheduling-related information generation device may divide the BO of the UE, at step S846, to the first and second carriers in proportion to C[k][0] and C[k][1], respectively. Accordingly, the BO for the first carrier (ulBoPerCell[k][0]) may be determined as a value obtained by multiplying the BO of the UE (ulBo[k]) by C[k][0]/(C[k][0]+C[k][1]). Likewise, the BO for the second carrier (ulBoPerCell[k][1]) may be determined as a value obtained by multiplying the BO of the UE (ulBo[k]) by C[k][1]/(C[k][0]+C[k][1]).

Otherwise, if the BO of the UE is less than the buffer threshold value, the scheduling-related information generation device may compare C[k][0] and C[k][1] at step S847. This aims to allocate the whole of the BO for one carrier because the BO is small when the BO of the UE is less than the BO allocation threshold value. In the present invention, the expression "allocating or dividing BO to carriers" may mean allocating or dividing the BO for data transmission of the UE over the carriers according to the BOs divided thereto.

Accordingly, if it is determined that C[k][0] is equal to or greater than C[k][1], the scheduling-related information generation device allocates the whole of the BO of the UE for the first carrier at step S848. Otherwise, if it is determined that C[k][0] is less than C[k][1], the scheduling-related information generation device allocates the whole of the BO of the UE for the second carriers at step S849.

If it is determined at step S844 that the transmit power is not allocated to one of the first and second carriers, the scheduling-related information generation device may determine at step S850 whether the transmit power allocated to the first carrier (srvCellPcmax[0]) is equal to the maximum possible output power of the UE. That is, the scheduling-related information generation device determines whether the maximum transmit power of the single uplink carrier scheduler for the first carrier is equal to the maximum possible output power of the UE. If the maximum transmit power of the single uplink carrier scheduler for the first carrier is equal to the maximum possible output power of the UE (i.e., srvCellPcmax[0]=Pcmax), the scheduling-related information generation device may allocate the whole of the BO of the UE for the first carrier at step S851.

Otherwise, if the maximum transmit power of the single uplink carrier scheduler for the second carrier is equal to the maximum possible output power of the UE (i.e., srvCellPcmax[1]=Pcmax), the scheduling-related information generation device allocates the whole of the BO of the UE for the second carrier at step S852.

The per-uplink carrier BO allocation information calculated as above is transmitted to the respective single uplink carrier schedulers, which perform uplink scheduling operations independently based on the received uplink BO allocation information.

Figure 9:
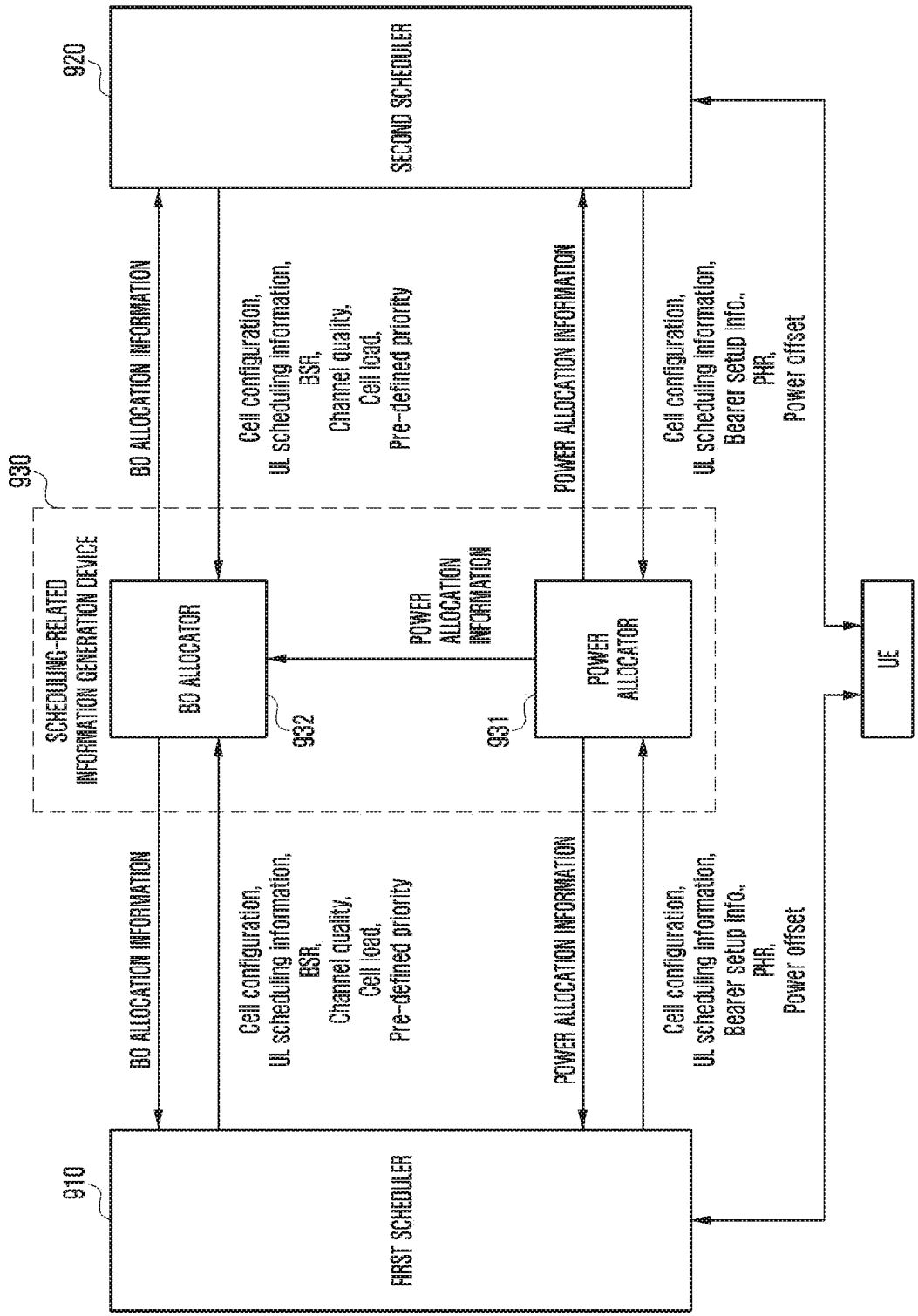
FIG. 9 is a diagram illustrating a system for scheduling a UE according to an embodiment of the present invention.

FIG. 9 is a diagram illustrating a system for scheduling a UE according to an embodiment of the present invention.

In reference to FIG. 9, the first and second schedulers 910 and 920 may be included in first and second cells, respectively. In this embodiment, the description is directed to a case where the first scheduler 910 is included in an eNB operating on the primary carrier, and the second scheduler 920 is included in an eNB operating on a secondary carrier.

The scheduling-related information generation device 930 may include a power allocator 931 and a BO allocator 932.

The first and second cells may configure their own cell information. The cell information may include cell configuration information, uplink scheduling information, bearer configuration information, channel quality information, per-carrier channel quality information, per-carrier load amount (average time-frequency resource use amount), and per-carrier priority information. The cell information may be configured by every cell or shared among the cells. The cell information may be included in the information received from a UE or calculated or analogized based on the information received from the UE.

Controllers of the first and second cells may generate the cell information and transmit the cell information to first and second schedulers, respectively.

The first and second schedulers may receive UE information including at least one of PHR and BSR from the UE.

Upon receipt of the cell information and the UE information, the first and second schedulers 910 and 920 may generate first and second reference information and transmit to the scheduling-related information generation device.

The reference information may include parameters necessary for determining power allocation information (e.g., PcellMetric, PcellThre, PCellMetricMargin, ScellMetric, ScellThre, SCellMetricMargin, and BO information), and the parameters may be calculated based on the UE information and cell information. The reference information may include parameters necessary for determining buffer occupancy information (e.g., variable information), and the parameters may be calculated based on the UE information and cell information. As described above, the reference information may include at least one of the cell information and the UE information received by the scheduler. The detailed description thereof has been made and thus is omitted herein.

The scheduler may transmit different reference information to the power allocator and BO allocator included in the scheduling-related information generation device. For example, the scheduler may transmit to the power allocator the per-uplink carrier cell configuration information, uplink scheduling information, bearer configuration information, PHR information, and channel quality information. The scheduler may transmit to the BO allocator the per-uplink carrier cell configuration information, uplink scheduling information, BSR information, per-carrier channel quality information, per-carrier load amount (average time-frequency resource use amount), and per-carrier priority information.

The scheduling-related information generation device may be located independently or included in the first or second cell. In the case where the scheduling-related information generation device is included in the first or second cell, the procedure for receiving the reference information from the first or second cell and transmitting the scheduling-related information to the first or second cell may be omitted. The detailed description thereof has been made with reference to FIGS. 5 to 7 and thus is omitted herein.

Upon receipt of the first and second reference information, the scheduling-related information generation device may generate the scheduling-related information based on the received information.

The power allocator 931 included in the scheduling-related information generation device may generate power allocation information based on any necessary information included in the received first and second reference information.

In detail, the power allocator 931 may compare per-uplink carrier electric field information for each uplink carrier and, if all of the electric field information is greater than a predetermined threshold value and the difference between per-uplink carrier electric field information is smaller than a predetermined difference, allocate powers for data transmission on the carriers according to the bandwidth ratio between the uplink carriers.

Otherwise, if electric field information of only one of the per-uplink carriers is greater than the predetermined threshold value and the difference between the per-uplink carrier electric field information is greater than the predetermined difference, the power allocator may allocate the power capable of transmission over all of the maximum-allocable PUSCH RBs for the carrier with the greater electric field information preferentially and then the remaining power for the other carrier. The detailed description thereof has been made with reference to FIG. 8B and thus is omitted herein.

Meanwhile, the BO allocator 932 included in the scheduling-related information generation device may generate the BO allocation information based on any necessary information included in the first and second reference information and the power allocation information.

In detail, the BO allocator determines whether the transmit powers allocated to the respective uplink carriers is equal to the maximum possible output power of the UE. If the transmit power allocated to one of the carriers is equal to the maximum possible output power of the UE, this means that the transmit power is allocated to one carrier and is not allocated to the other. Since no packet is transmitted over the carrier for which no transmit power has been allocated, there is no need to allocate BO; thus, the BO allocator may allocate the whole of the BO of the UE for data transmission on the carrier for which the transmit power has been allocated.

If the transmit powers allocated for both of the uplink carriers are not equal to the maximum possible output power of the UE, the BO allocator determines whether the BO is greater than a predetermined threshold value. If the BO is greater than the predetermined threshold value, the BO allocator may allocate BO according to the per-carrier variable information. Here, the variable information may be one of uplink data rate, per-cell available average uplink resource use amount, and arbitrary constant set per cell.

If the BO is less than the predetermined threshold value, the BO allocator may allocate the whole of BO of the UE for the carrier with the greater variable information. The detailed description thereof has been made with reference to FIG. 8C and thus is omitted herein.

The scheduling-related information generation device may transmit to the first and second schedulers the first scheduling-related information including the power allocation information and BO allocation information for the first carrier and the second scheduling-related information including the power allocation information and BO allocation information for the second carrier, respectively.

The first and second schedulers may generate scheduling information based on the scheduling-related information and schedule the UE based on the scheduling information.

As described above, the scheduling-related information generation device may be included in one or both of the cells. The schedulers may perform the role of the scheduling-related information generation device and, in this case, the schedulers may share the reference information generated based on the UE information and cell information and generate per-cell scheduling information based on the reference information.

Figure 10:
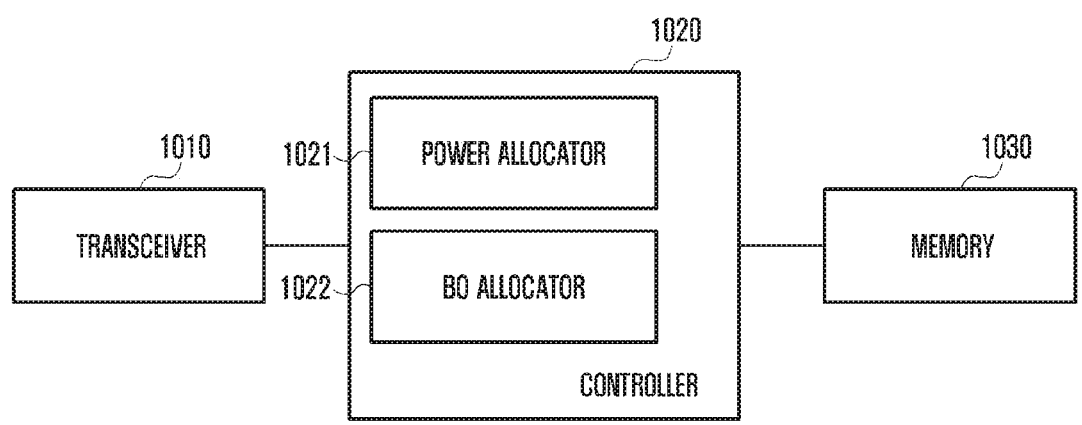
FIG. 10 is a block diagram illustrating a configuration of a scheduling-related information generation device according to an embodiment of the present invention.

FIG. 10 is a block diagram illustrating a configuration of a scheduling-related information generation device according to an embodiment of the present invention.

In reference to FIG. 10, the scheduling-related information generation device 1000 may include a communication unit 1010, a controller 1020, and a storage unit 1030.

According to an embodiment of the present invention, the communication unit 1010 may communicate signals with other network entities. For example, the communication unit 1010 may receive reference information from a scheduler. The communication unit 1010 may also receive eNB information and UE information. The eNB information and UE information may be included in the reference information. The communication unit 1010 may also transmit scheduling-related information to eNBs.

According to an embodiment of the present invention, the controller 1020 may include a power allocator 1021 and a BO allocator 1022.

The power allocator 1021 may determine the power allocation information for data transmission of the UE over respective carriers based on the received reference information. The power allocator 1021 may receive the reference information including cell configuration information, uplink scheduling information, bearer configuration information, PHR information, and channel quality information. The reference information may include parameters for use in determining the power allocation information such as PcellMetric, PcellThre, PCellMetricMargin, ScellMetric, ScellThre, and SCellMetricMargin.

In detail, the power allocator 1021 may calculate a transmit power offset for first carrier (PcellTxPowerOffset) and a remaining transmit power (RemainedTxPower) by subtracting the transmit power offset from the maximum possible output power of the UE (Pcmax) to determine whether the remaining transmit power is greater than 0.

If it is determined that the remaining transmit power is less than 0, the power allocator 1021 may allocate the whole of the maximum possible output power of the UE for use on the primary carrier and no power for use on the secondary carrier.

Otherwise, if it is determined that the remaining transmit power is greater than 0, the power allocator 1021 may make comparisons between PcellMetric and PcellThre, between ScellMetric and ScellThre, and between an absolute value of the difference between PcellMetric and ScellMetric and a difference threshold value (DifferThre).

If the PcellMetric and ScellMetric are greater than the PcellThre and ScellThre respectively and the absolute of the difference between the PcellMetric and ScellMetric is less than DifferThre, the power allocator 1021 may set the transmit powers for the primary carrier and secondary carrier according to a bandwidth ratio.

Meanwhile, if the calculated remaining transmit power is greater than 0 and the condition of PcellMetric>PcellThre and ScellMetric>ScellThre or the condition of the absolute value of the difference between the PcellMetric and ScellMetric<DifferThre is not satisfied, the power allocator 1021 may determine whether the sum of the PcellMetric and the margin of the PcellMetric (PcellMetricMargin) is equal to or greater than ScellMetric.

If the sum of the PcellMetric and the margin of the PcellMetric (PcellMetricMargin) is equal to or greater than the ScellMetric, the power allocator 1021 may allocate the primary subcarrier's maximum transmit power for the primary carrier.

If the condition of PcellMetric>PcellThre and ScellMetric>ScellThre or the condition of the absolute value of the difference between the PcellMetric and ScellMetric<DifferThre is not satisfied and if the sum of the PcellMetric and the margin of the PcellMetric (PcellMetricMargin) is less than the ScellMetric, the power allocator 1021 may allocate transmit power corresponding to the smallest one between the remaining transmit power (RemainedTxPower) and the transmit power required for all RBs corresponding to a maximum number of PUSCH RBs allocable on the secondary carrier for the secondary carrier and then the remaining transmit power for the primary carrier.

The power allocation information indicating the per-uplink carrier maximum allowable transmit powers calculated as above may be transmitted to the respective single uplink carrier schedulers, which perform uplink transmit power control independently based on the power allocation information.

The power allocator 1021 may transmit the determined power allocation information to the eNBs operating on the corresponding carriers.

The power allocator 1021 may determine the power allocation information for the respective carriers and send the power allocation information to the BO allocator 1022. The reason why the power allocator 1021 sends the power allocation information to the BO allocator 1022 is that it is impossible to transmit as much data as fits to the BO allocated for the corresponding carrier if no or insufficient power is allocated, even though a large BO is allocated for the carrier (i.e., large amount of data to be transmitted are allocated). Accordingly, the BO allocator may perform BO allocation based on the power allocation information.

The BO allocator 1022 may determine the BOs to be allocated for the respective carriers based on the received reference information. The BO means the amount of data stored in the UE, which may determine the sizes of data packets to be transmitted over the respective carriers according to the BOs allocated for the respective carriers and transmit the data packets.

Accordingly, the BO allocator 1022 may determine the BOs to be allocated for the respective carriers based on per-carrier channel condition, pathloss, and per-eNB signal qualities.

In detail, the BO allocator 1022 may update variable information, buffer threshold values, and BO information.

If both the single uplink carrier schedulers operating on the respective first and second carriers have the transmit power equal to the maximum possible output power, the BO allocator 1022 compares the BO of the UE with a buffer threshold value.

If the BO of the UE is equal to or greater than the buffer threshold value, the scheduling-related information generation device may divide the BO of the UE to the first and second carriers in proportion to the per-carrier variable information.

Otherwise, if the BO of the UE is less than the buffer threshold value, the scheduling-related information generation device may compare the variable information of the first and second carriers with each other. If the variable information of the first carrier is equal to or greater than the variable information of the second carrier, the BO allocator 1022 may allocate the whole of the BO of the UE for the first carrier. Otherwise, if the variable information of the first carrier is less than the variable information of the second carrier, the BO allocator 1022 may allocate the whole of the BO of the UE for the second carrier.

If no power is allocated for one of the first and second carriers, the BO allocator 1022 may determine whether the maximum transmit power of the single uplink carrier scheduler operating on the first carrier is equal to the maximum possible output power of the UE.

If the maximum transmit power of the single uplink carrier scheduler operating on the first carrier is equal to the maximum possible output power of the UE, the BO allocator 1022 may allocate the whole of the BO of the UE for the first carrier.

Otherwise, if the maximum transmit power of the single uplink carrier scheduler operating on the second carrier is equal to the maximum possible output power of the UE, the BO allocator 1022 may allocate the whole of the BO of the UE for the second carrier.

The per-uplink carrier BO allocation information calculated as above is transmitted to the respective single uplink carrier schedulers, which perform uplink scheduling operations independently based on the received uplink BO allocation information.

Figure 11:
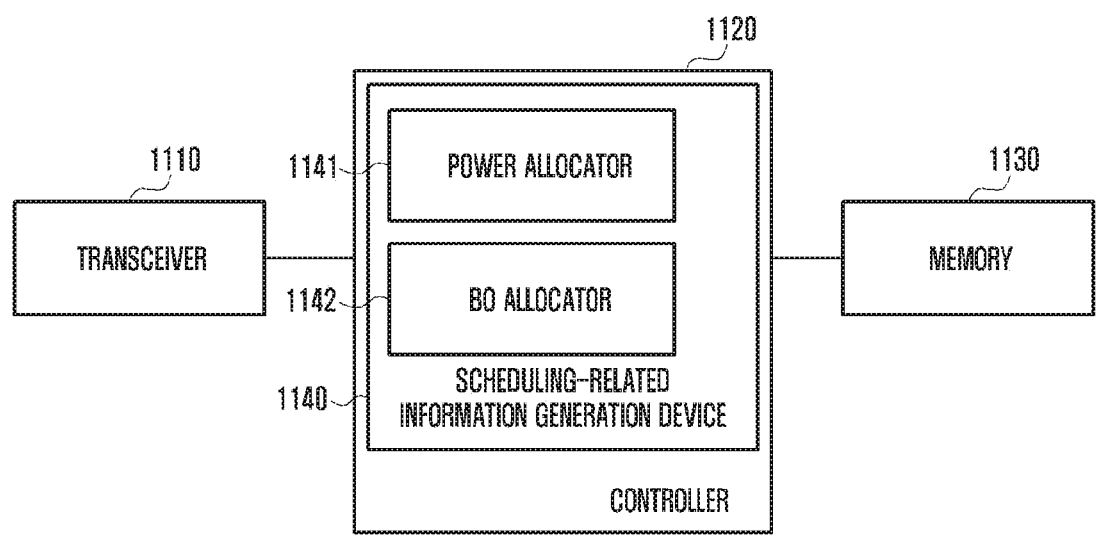
FIG. 11 is a block diagram illustrating a configuration of an eNB including a scheduling-related information generation device according to an embodiment of the present invention.

FIG. 11 is a block diagram illustrating a configuration of an eNB including a scheduling-related information generation device according to an embodiment of the present invention.

In reference to FIG. 11, the eNB may include a communication unit 1110, a controller 1120, and a storage unit 1130.

According to an embodiment of the present invention, the communication unit 1110 may communicate signals with other network entities. The communication unit 1110 may receive reference information from another eNB and transmit scheduling-related information. The communication unit 1110 may receive reference information from another cell of the corresponding eNB and transmit the scheduling-related information.

According to an embodiment of the present invention, the controller 1120 may include the scheduling-related information generation device 1140, which may include a power allocator 1141 and a BO allocator 1142. The controller 1120 may have a scheduler including the scheduling-related information generation device 1140.

This embodiment is directed to a case where the scheduling-related information generation device 1140 for generating scheduling-related information is included in the eNB. In this case, the scheduling-related information generation device 1140 may be included in one of a first eNB hosting a first cell operating on a primary carrier and a second eNB hosting a second cell operating on a secondary carrier. The eNB hosting the first cell and the eNB hosting the second cell may be the same eNB or different eNBs.

If the scheduling-related information generation device 1140 is included in the first eNB, the first reference information for use in generating the scheduling-related information is generated by the controller 1120 of the first eNB and, in this case, the scheduling-related information generation device 1140 may check the first reference information with no receiving process. Accordingly, the scheduling-related information generation device 1140 may receive only the second reference information from the second eNB.

Likewise, if the scheduling-related information generation device 1140 is included in the second eNB, the second reference information for use in generating the scheduling-related information is generated by the controller of the second eNB and, in this case, the scheduling-related information generation device 1140 many check the second reference information with no receiving process. Accordingly, the scheduling-related information generation device 1140 may receive only the first reference information from the first eNB.

If the first and second eNBs are the same eNB, however, the scheduling-related information generation device 1140 may check the reference information with no process of receiving the reference signal from any cell.

In the case where the scheduling-related information generation device 1140 is included in the first eNB, the scheduling-related information generation device 1140 may generate the scheduling-related information and transmit the scheduling-related information to the second eNB. However, the controller of the first eNB may check the scheduling-related information generated by the scheduling-related information generation device 1140 with no receiving process and schedule the UE based on the scheduling-related information.

Likewise, in the case where the scheduling-related information generation device 1140 is included in the second eNB, the scheduling-related information generation device 1140 may generate the scheduling-related information and transmit the scheduling-related information to the first eNB. However, the controller of the second eNB may check the scheduling-related information generated by the scheduling-related information generation device 1140 with no receiving process and schedule the UE based on the scheduling-related information.

However, if the first and second eNBs are the same eNB, the scheduling-related information generation device 1140 may not transmit the scheduling-related information to any cell and, in this case, the per-cell schedulers may check the scheduling-related information and schedule the UE based on the scheduling-related information.

The detailed description of the procedure for the power allocator and BO allocator included in the scheduling-related information generation device 1140 to determine the power allocation information and BO allocation information has been described with reference to FIG. 10 and thus is omitted herein.

Although the above descriptions are directed to the exemplary cases of using 2-uplink carrier aggregation schedulers, the present invention is not limited thereto and may include the embodiments of using other multi-uplink carrier aggregation schedulers.

Although the description has been made with reference to particular embodiments, the present invention can be implemented with various modifications without departing from the scope of the present invention. Thus, the present invention is not limited to the particular embodiments disclosed and will include the following claims and their equivalents.

The invention claimed is:

1. A scheduling-related information generation method of a scheduling-related information generation device in a wireless communication system, the method comprising:
    receiving first reference information and second reference information generated based on at least one of cell information and terminal information, the terminal information being transmitted by a terminal;
    generating first scheduling-related information based on the received first and second reference information and second scheduling-related information based on the first scheduling-related information; and
    transmitting the first scheduling-related information to a first cell and the second scheduling-related information to a second cell,
    wherein the first scheduling-related information for the first cell and the second scheduling-related information for the second cell may be correlated.

2. The method of claim 1, wherein the device is included in one of the first cell, second cell or separately located.

3. The method of claim 1, wherein the first scheduling-related information is used for scheduling a terminal on a first carrier in use by the first cell, and the second scheduling-related information is used for scheduling the terminal on a first carrier in use by the second cell, the terminal being scheduled simultaneously on the first carrier and second carrier.

4. The method of claim 1, wherein at least one of the first scheduling-related information and the second scheduling-related information comprises at least one of power allocation information and buffer occupancy allocation information.

5. The method of claim 4, wherein the second scheduling-related information comprises second power allocation information obtained by subtracting first power allocation information included in the first scheduling-related information from information of power allowed for use by a terminal and second buffer occupancy allocation information obtained by subtracting first buffer occupancy allocation information included in the first scheduling-related information from buffer occupancy information of the terminal.

6. The method of claim 1,
    wherein the first reference information is generated based on first cell information related to the first cell and terminal information and comprises at least one of cell configuration information for a first carrier in use by the first cell, bearer configuration information, power headroom reporting (PHR) information, buffer status reporting (BSR) information, channel quality information, load information, and priority information, and
    wherein the second reference information is generated based on second cell information related to the second cell and the terminal information and comprises at least one of cell configuration information for a second carrier in use by the second cell, uplink scheduling information, bearer configuration information, PHR information, BSR information, channel quality information, load information, and priority information.

7. The method of claim 6, wherein the power allocation information is determined based on a ratio of frequency bands of the first cell and second cell if a first electric field information of the first carrier is greater than a predetermined first threshold value, if a second electric field information of the second carrier is greater than a predetermined second threshold value, and if a difference between the first and second electric field information is less than a predetermined threshold difference value.

8. A device for generating scheduling-related information in a wireless communication system, the device comprising:
    a transceiver configured to communicate with other network entities; and
    a controller configured to:
        receive first reference information and second reference information generated based on at least one of cell information and terminal information, the terminal information being transmitted by a terminal,
        generate first scheduling-related information based on the received first and second reference information and second scheduling-related information based on the first scheduling-related information, and
        transmit the first scheduling-related information to a first cell and the second scheduling-related information to a second cell,
        wherein the first scheduling-related information for the first cell and the second scheduling-related information for the second cell may be correlated.

9. The device of claim 8, wherein the device is included in one of the first cell, second cell or separately located.

10. The device of claim 8, wherein the first scheduling-related information is used for scheduling a terminal on a first carrier in use by the first cell, and the second scheduling-related information is used for scheduling the terminal on a second carrier in use by the second cell, the terminal being scheduled simultaneously on the first and second carriers.

11. The device of claim 8, wherein at least one of the first scheduling-related information and the second scheduling-related information comprises at least one of power allocation information and buffer occupancy allocation information.

12. The device of claim 11, wherein the second scheduling-related information comprises a second power allocation information obtained by subtracting a first power allocation information included in the first scheduling-related information from information of power allowed for use by a terminal and a second buffer occupancy allocation information obtained by subtracting a first buffer occupancy allocation information included in the first scheduling-related information from buffer occupancy information of the terminal.

13. The device of claim 8, wherein the first reference information is generated based on first cell information related to the first cell and terminal information, and the second reference information is generated based on second cell information related to the second cell and the terminal information.

14. The device of claim 8,
    wherein the first reference information comprises at least one of cell configuration information for a first carrier in use by the first cell, uplink scheduling information, bearer configuration information, power headroom reporting (PHR) information, buffer status reporting (BSR) information, channel quality information, load information, and priority information, and wherein the second reference information comprises at least one of cell configuration information for a second carrier in use by the second cell, uplink scheduling information, bearer configuration information, PHR information, BSR information, channel quality information, load information, and priority information.

15. The device of claim 14, wherein the power allocation information is determined based on a ratio of frequency bands of the first cell and second cell if a first electric field information of the first carrier is greater than a predetermined first threshold value, if a second electric field information of the second carrier is greater than a predetermined second threshold value, and if a difference between the first and second electric field information is less than a predetermined threshold difference value.

* * * * *